United States Patent [19]
Wheeler et al.

[11] Patent Number: 5,649,260
[45] Date of Patent: Jul. 15, 1997

[54] AUTOMATED PHOTOFINISHING APPARATUS

[75] Inventors: Richard Bruce Wheeler, Webster; Daniel Michael Pagano, Henrietta, both of N.Y.

[73] Assignee: Eastman Kodak Company, Rochester, N.Y.

[21] Appl. No.: 576,721

[22] Filed: Dec. 21, 1995

Related U.S. Application Data

[63] Provisional application No. 60/000,519 Jun. 26, 1995.
[51] Int. Cl.$^6$ ................................................. G03D 13/00
[52] U.S. Cl. ........................... 396/569; 396/578; 396/570
[58] Field of Search .................................. 354/298, 308, 354/309–313, 319–324, 334; 364/479, 525; 355/38–41, 29, 27, 28, 77; 396/569, 570, 578; 430/30, 398–400

[56] References Cited

U.S. PATENT DOCUMENTS

| | | | |
|---|---|---|---|
| 3,804,255 | 4/1974 | Speece | 210/194 |
| 4,166,701 | 9/1979 | Miller | 355/35 |
| 4,167,327 | 9/1979 | DiNatale | 355/77 |
| 4,211,558 | 7/1980 | Oguchi et al. | |
| 4,345,999 | 8/1982 | Sigdell et al. | 210/188 |
| 4,375,324 | 3/1983 | Holmes | 354/303 |
| 4,529,512 | 7/1985 | Williamson et al. | 210/120 |
| 4,834,306 | 5/1989 | Robertson et al. | 354/275 X |
| 4,857,968 | 8/1989 | Peterson | 355/72 |
| 4,927,533 | 5/1990 | Takase et al. | 210/257.1 |
| 4,942,416 | 7/1990 | Yoshimi | 354/324 X |
| 5,032,707 | 7/1991 | Gudmundson et al. | 355/40 X |
| 5,093,684 | 3/1992 | Crochetierre et al. | 355/40 |
| 5,093,686 | 3/1992 | Shigaki | 355/77 |
| 5,113,351 | 5/1992 | Bostic | 364/479 |
| 5,132,915 | 7/1992 | Goodman | 364/479 |
| 5,233,386 | 8/1993 | Terashita | |
| 5,258,796 | 11/1993 | Patterson | 354/324 |
| 5,289,223 | 2/1994 | Woog | 354/324 |
| 5,291,420 | 3/1994 | Matsumoto et al. | 364/525 |
| 5,319,408 | 6/1994 | Shiota | 396/569 |
| 5,397,468 | 3/1995 | Chomka et al. | 210/232 |
| 5,440,365 | 8/1995 | Gates et al. | 396/569 |
| 5,452,040 | 9/1995 | Nishida et al. | 396/569 |

FOREIGN PATENT DOCUMENTS

| | | |
|---|---|---|
| 2050328 | 9/1990 | Canada . |
| 0234833 | 9/1987 | European Pat. Off. . |
| 0610811 | 8/1994 | European Pat. Off. . |
| 0709733 | 5/1996 | European Pat. Off. . |
| 2466794 | 4/1981 | Germany . |
| 89/08901 | 9/1989 | WIPO . |
| 71525/91 | 6/1991 | WIPO . |

OTHER PUBLICATIONS

Patent Abstracts of Japan, vol. 14, No. 189, (P–1037), Rigio Waki, Pub. No. JP2035440 Feb. 6, 1990.

"Modern Exposure Determination for Customizing Photofinishing Printer Response", E. Goll et al, published in the *Journal of Applied Photographic Engineering*, vol. 5, No. 2, Spring 1979.

*Primary Examiner*—D. Rutledge
*Attorney, Agent, or Firm*—Frank Pincelli

[57] ABSTRACT

A method and apparatus for receiving exposed film, processing the exposed film, printing the processed film so as to produce prints, and dispensing of the prints and processed film to a customer. The apparatus includes a mechanism for delivering to the apparatus an exposed strip of film. The film has a first unexposed area and a second exposed area containing images. A mechanism is also provided for providing a reference exposure onto the first unexposed area. The apparatus also includes a processing section for processing the exposed film so as to develop the images on a second area of the film and the reference exposure on the first area a section for scanning the first and/or second areas so as to obtain information regarding the photometric balance of the film. The apparatus prints the film in accordance with the information data received from the scanner. A storage and dispensing mechanism is provided for each customer order.

40 Claims, 3 Drawing Sheets

AUTOMATED PHOTOFINISHING APPARATUS

CROSS REFERENCE TO RELATED APPLICATION

Reference is made to and priority claimed from U.S. Provisional Application Ser. No. 60/000,519, filed 26 Jun. 1995, entitled AUTOMATED PHOTOFINISHING APPARATUS.

FIELD OF THE INVENTION

The present invention relates to an automated, interactive photofinishing system which receives, processes and prints photographic film onto photosensitive paper.

BACKGROUND OF THE INVENTION

Traditional methods of photofinishing photographic roll-film involves an individual taking exposed film to a photofinishing store or mailing the exposed film to a photofinishing processing center where the film is processed. In the typical processing system, film, in the form of a strip, is removed from the film cartridge supplied by a customer and is spliced together with a plurality of other individual strips of film and passed through a processor, after which it is exposed at a printer and cut-up and returned to the customer along with the printed photographic prints. A typical photofinishing processor requires careful control of the chemistry used for development of the film and paper and also requires specific film and paper handling equipment in order to process and handle the film. Quite often in the typical photofinishing processor, various test strips are periodically passed through the processor so that appropriate adjustments can be made to the chemistry in order to provide high quality prints.

U.S. Pat. No. 5,113,351 discloses an automated interactive system for receiving, storing, processing, retrieving, and dispensing film. The '351 reference discloses providing an automated processing apparatus for the processing and printing of the film. While such a concept may be desirable, the lack of control of the chemistry in such a system can present a barrier to commercialization. In particular, the machine would not be able to operate for extended periods of time without trained individuals performing required maintenance and calibrations to the device. It is anticipated in such automated-type machines that the machines would sit idle for various lengths of time, especially during the evening wherein such devices are not easily accessible to the public and, depending upon the location at which it is placed, access would be virtually non-existent during vacation and holiday times. It is also important in such an automated photofinishing apparatus that the first few prints that are produced be of high quality as are those produced after long continuous operation of the apparatus. Additionally, it is necessary to provide appropriate controls for monitoring the operation and providing the appropriate adjustments to assure that high quality images are continuously produced.

Applicants have invented an automated photofinishing apparatus which solves the problems of the prior art. In particular, a device made in accordance with the present invention can be used by an untrained individual and provides means for automatically monitoring and calibrating the photofinishing process to assure that high quality photofinishing prints or images are produced continuously in the apparatus.

SUMMARY OF THE INVENTION

In one aspect of the present invention there is provided an automated photofinishing apparatus for receiving exposed film, processing the exposed film, printing the processed film so as to produce prints, and dispensing of the prints and processed film to a customer, comprising:

means for delivering to the apparatus an exposed strip of film, the film having a first unexposed area and a second exposed area containing images;
means for applying a reference exposure onto the first unexposed area;
means for processing the exposed film so as to develop the images on a second area of the film and the reference exposure on the first area;
means for scanning the first and/or second areas so as to obtain information regarding the photometric balance of the film;
means for printing the film in accordance with the information data received from the means for scanning;
means for processing the prints; and
means for delivering the prints to the customer.

In another aspect of the present invention there is provided an automated photofinishing apparatus for receiving exposed film, processing the exposed film, printing the processed film so as to produce prints, and dispensing of the prints and processed film to a customer, comprising:

means for delivering to the apparatus an exposed film, the film having a first unexposed area and a second exposed area containing images;
means for applying a reference exposure onto the first unexposed area;
means for processing the exposed film so as to develop the images on a second area of the film and the reference exposure on the first area;
means for printing the film;
means for scanning the prints in the area produced form the first and/or second areas of the developed film and obtaining data regarding the degree which the prints meet predetermined standards;
means for storing the data;
means for adjusting at least one photofinishing parameter in response to the data for use in later photofinishing;
means for processing the prints; and
means for delivering the prints to the customer.

In yet another aspect of the present invention there is provided a method for automatically processing a photosensitive filmstrip and producing prints therefrom for delivery to a customer, comprising the steps of:

a) providing a photosensitive filmstrip having a first unexposed area and a second exposed area contain at least one latent image;
b) providing an exposure of a known light intensity onto the unexposed first area;
c) developing the photosensitive material;
d) scanning the first and second areas so as to obtain information regarding the photometric balance of the filmstrip for use in determining printing conditions therefrom;
e) printing the images on filmstrip in accordance with the determined information; and
f) processing the images on the filmstrip so as to produce prints and returning the prints to the user.

In still another aspect of the present invention there is provided a method of calibrating a photofinishing apparatus comprising the steps of:

a) providing an roll of a photosensitive filmstrip having a first area of film of know exposures designed to film manufacturing specifications and a second unexposed area;
b) providing an exposure of a known light intensity onto the second unexposed area;

c) developing the photosensitive material;
d) scanning the first area and second areas of the filmstrip so as to obtain information regarding the photometric balance of the filmstrip; and
e) adjusting the printing and/or processing parameters of the apparatus for use in later photofinishing by the apparatus.

DETAILED DESCRIPTION OF THE DRAWINGS

Figure 1:
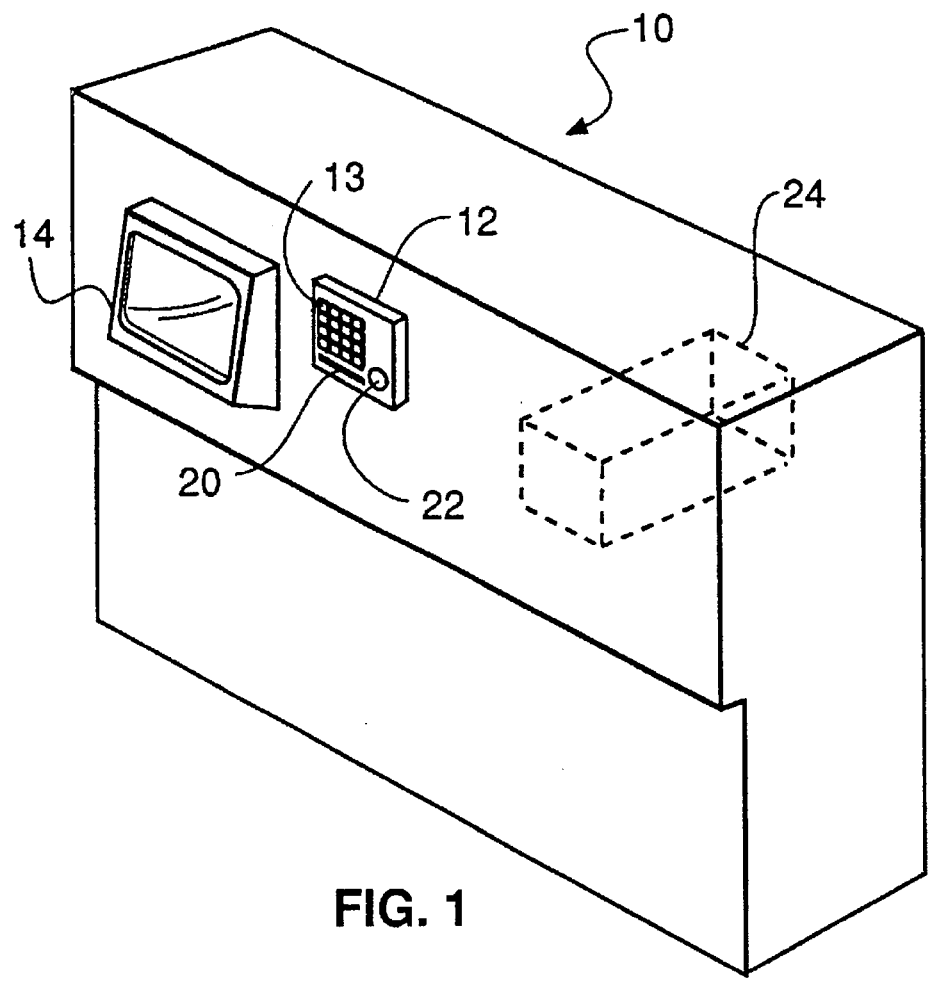
FIG. 1 is a perspective view of a photofinishing apparatus made in accordance with the present invention.

Referring to FIG. 1, there is illustrated an automated photofinishing apparatus 10 made in accordance with the present invention. The apparatus 10 includes a control panel 12 and a display device 14. The control panel 12 includes data entry means for entering customer information data relating to the order being placed. In the particular embodiment illustrated, data entry means comprise a plurality of touch keypads 13 having appropriate indicia thereon. It is to be understood that the data entry means can be any type device desired. For example, but not by way of limitation, the data entry means may comprise a touch sensitive CRT screen or card reader for reading a customer ID order card which could include customer photofinishing preferences. The control panel 12 also includes payment mechanism for receiving payment from a customer. In the particular embodiment illustrated, the payment mechanism is a credit card reader which includes a slot 20 for receipt of a credit card to the payment mechanism. The credit card can also be used to provide customer ID and other information, e.g., address. The mechanism may also be designed to receive cash payment, or any other form of acceptable payment.

A cartridge delivery opening 22 is provided for receiving a film cartridge of a predetermined type or types. In the particular embodiment illustrated, the opening 22 is designed to receive a film cartridge 30 (see FIG. 2) of the thrust type such as disclosed and described in U.S. Pat. No. 4,834,306, which is hereby incorporated by reference. In these particular type film cartridges the filmstrip can be thrust out of or back into the cartridge by rotation of the spool. The trail end of the filmstrip is detachably connected to the spool.

A computer (CPU) 24 is provided for controlling operation of the apparatus and the various components therein.

The display device 14, in the particular embodiment illustrated, is a video tube (CRT) which is used to display instructional order information which is used by the customer to enter order information. The display device 14 can also be used for various other functions as described later herein, for example, but not by way of limitation, the display can be used to preview images developed on the photosensitive material prior to printing of the images, and used as a touch screen for customer order selections.

The cartridge delivery opening 22 is such that the film cartridge disposed therein will be forwarded onto a processing unit wherein the film contained therein is developed. An example of a possible processing apparatus is described in copending application U.S. Ser. No. 08/330,271, filed Oct. 27, 1994, entitled "Method and Apparatus for Processing Photosensitive Film", by Daniel M. Pagano, Richard B. Wheeler and Kevin J. Klees, which is hereby incorporated by reference. This application describes an apparatus capable of processing the filmstrips without detaching the exposed filmstrip from the cartridge. The elimination of the detach/attach film procedures from the cartridge as typically provided in photofinishing operations makes possible the inclusion of a robust connection between the film and the cartridge. This sturdy film/cartridge connection helps to insure that the film can be readily withdrawn from and returned to the cartridge in the subsequent stages of image preparation, storage, and retrieval.

Figure 2:
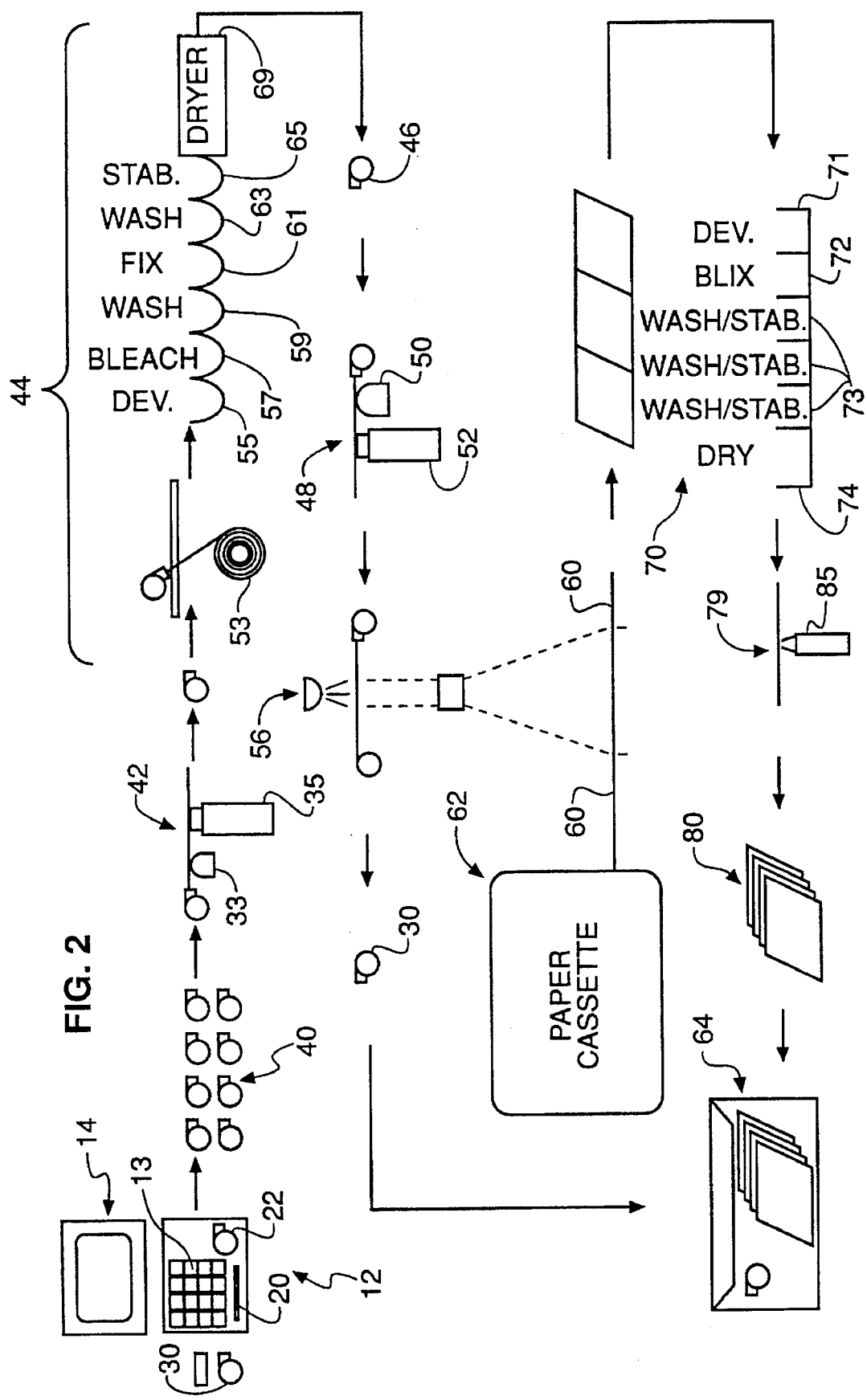
FIG. 2 is a schematic diagram of a photofinishing system made in accordance with the present invention illustrating the various features and operation of the apparatus of FIG. 1.

Referring to FIG. 2, there is illustrated a schematic flow diagram of the operation of the apparatus 10. Operation of apparatus 10 is initiated when a customer inserts a thrust-type film cartridge 30 into slot 22. The display device 14 then displays appropriate questions/instructions whereby the user can respond by pressing the appropriate selected keypads 13. Thereafter, the thrust cartridges 30 placed therein are transferred to a waiting station 40 where the cartridges 30 are queued up for processing. As can be seen, eight cartridges are in queue, however, the device may queue any number of cartridges. Thereafter, in sequence, each film cartridge is moved to film preparation station 42 where the film in the thrust cartridge 30 is thrust outward and any magnetic information that may have been previously encoded on the film is read by scanner 33. This data may include, for example, special processing data and printing data or instructions previously created by the film manufacturer, camera manufacturer, or photographer. Film preparation station 42 also includes a step scale sensitometer 35. The sensitometer 35 applies a series of reference patches of known exposure to an unexposed area of each filmstrip. In the particular embodiment illustrated, sensitometer 35 comprises a pulsed light source and a step scale for obtaining the desired exposure levels. The reference patches created by the strobe light and step scales on the film play an integral part in the calibration of the automated photofinishing apparatus 10.

Figure 3:
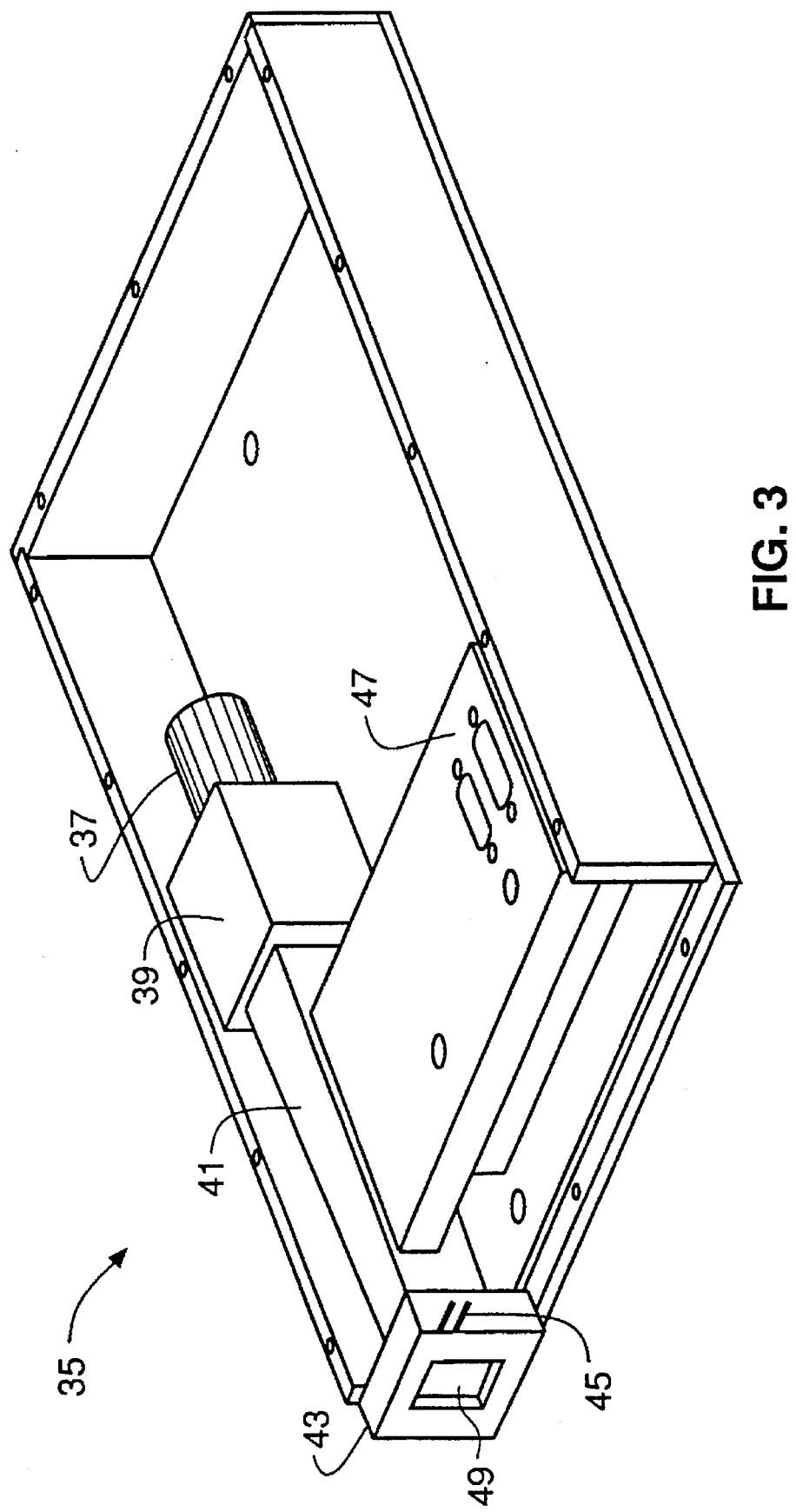
FIG. 3 is a perspective view of a reference patch sensitometer for use in the apparatus of FIG. 1.

Referring to FIG. 3, there is illustrated sensitometer 35. Sensitometer 35 comprises a pulsed xenon lamp 37, a optical filter 39 for providing a spectrally balanced illumination. A light pipe 41 is placed at the exit of filter 39 for providing uniform illumination on to a film exposure gate 43. A photo diode 45 is placed at the film gate 43 which measures the accumulated light output of the lamp 37 and passes this information onto the microprocessor control 47 which in turns controls the operation of the lamp 37 so as to provide the desired amount of exposure. In the particular embodiment illustrated, an very accurate amount of exposure is obtained by using hundreds of short duration pulses from the lamp 37 to obtain the desired exposure. The accuracy of this system is assured since each pulse contributes a very small percentage to the overall exposure and the total number of pulses is varied by the microprocessor control 47 to achieve the desired exposure. A series of reference patches 49 is disposed at the film gate 43 for exposure on to a film which is placed at film gate 43.

Figure 4:
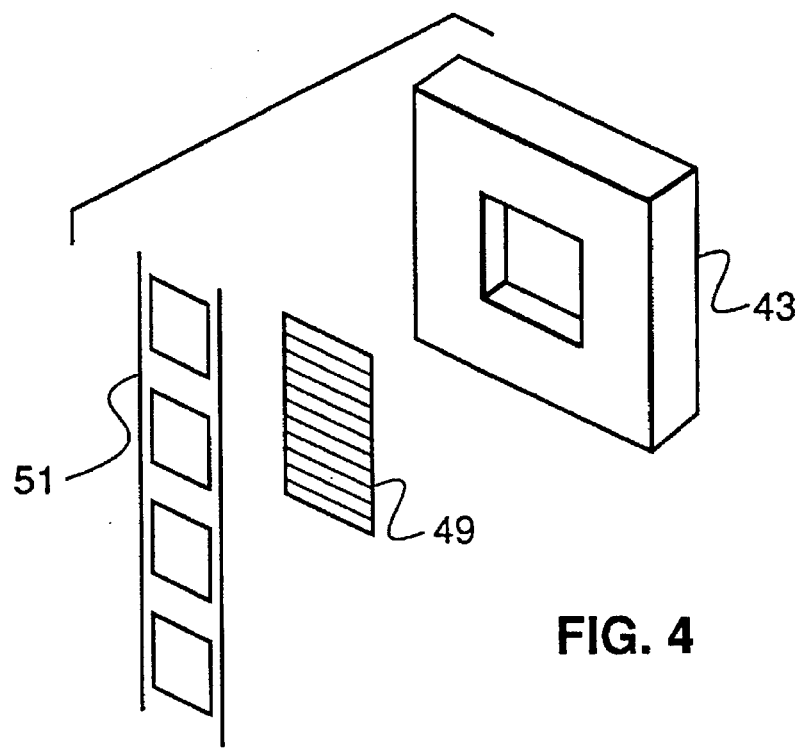
FIG. 4 is a partial enlarged perspective view of a filmstrip, an exposure step scale, and film gate of the sensitometer of FIG. 3.

Referring to FIG. 4, there is illustrated a partial enlarged perspective view of the film gate 43, filmstrip 51, and reference patches 49. The reference patches 49 comprise a achromatic stepped exposure scale which consists of eleven steps each becoming darker by increments of 0.3 log exposure. In the embodiment illustrated the eleven step exposure scale takes up an area equal to about one normal image frame. Alternatively, the reference exposures can be obtained by use of slit aperture at the film gate 43 and advancing the film at the gate 43 for exposure of a series of patches, each patch being formed by a different number of pulses of lamp 37. The unexposed area of film 51 is placed at the film gate 43 whereby the series of reference patches are placed on the film.

After this is done, the film is rewound into the film cartridge 30 and passed onto the processing section 44 of the apparatus. In the processing section 44, the exposed film is developed. That is, the film will be subjected to various chemical baths. In the embodiment illustrated, the portion on filmstrip containing exposed images is thrust out of the cartridge 30 into a reel 53 which holds the film in a generally spiral configuration. The film, while in reel 53, is sequentially passed through a development bath 55, a bleach bath 57, a wash bath 59, a fix bath 61, a wash bath 63 and a stabilizing bath 65. After the film has gone through these baths, it is passed through a dryer 69 for drying of the filmstrip.

After the film in the cartridge has been properly processed and rewound back into the cartridge, it is then forwarded onto transfer station 46. Then, cartridge 30 is forwarded to read station 48 wherein the filmstrip is again thrust out of the cartridge and scanned by scanners 50,52 whereby the processed images and magnetically encoded data are read. In the particular embodiment illustrated, scanner 50 comprises a CCD array (charged coupled device) for reading of the developed images and scanner 52 comprises a magnetic read head for reading the magnetically encoded data. The data read may include special processing instructions, printing data, or instruction previously written on the film by the manufacturer, camera manufacturer, or photographer. Also, the sensitometric reference patches that were placed on the film at station 42 are optically scanned by scanner 50 and their spectral density characteristics determined. This may be done as is well known in the prior art, for example, as done by the Eastman Kodak Company CLAS 35 color printer. This data could be incorporated in the scene balance algorithm, where the printing conditions are calculated for each image frame. The optical printing conditions, in the form of printing times, (LogE offsets) or transfer densities (adjusted densities representing the optical printing conditions), are applied in the printing station 56, and also may be magnetically written onto a transparent magnetic layer coated on the film. In the particular embodiment shown, the printing station 56 comprises an optical enlarging device. However, it is to be understood that the printing station may comprise any other desired printing device, e.g., CRT printer, laser printer, or LED printer. Once written, these image frames and specific transfer densities may be used in subsequent reprinting, display, or editing operation. Since these transfer densities represent known offsets from a base-line exposure position, it is now possible to design printing and displaying apparatus that perform all the desired functions without the necessity for including built-in scanners or scene balancing algorithms in each device. This enables a significant cost-performance advantage in all image reproducing display devises which are designed to use the magnetically coded film contained in thrust type cartridges.

The sensitometric reference patches that are placed on the roll by apparatus 10 provides a roll-specific film color balance offset, capable of minimizing print color variability. In typical prior art optical printers, by reading the film barcode (DX data) the printers are capable of segregating numerous film types and selecting predefined average printing parameters for these films. Scene balance algorithms use the predefined film-type data and either frame-by-frame or full roll film analysis to determine the printing conditions for each frame. Unfortunately, these techniques are not always able to distinguish sources of color variability that demand high levels of printer chromatic correction (film manufacturing, chemical processing, film keeping, illuminant color), from color shifts that do not require high levels of printer chromatic correction (scene colors). A discussion as to the difficulties of determining the ideal chromatic correction level is set forth in an article entitled "Modern Exposure Determination For Customizing Photofinishing Printer Response", published in the *Journal of Applied Photographic Engineering*, Volume 5, No. 2, Spring 1979. While advances have been made since the publishing of this article, this problem still persists, especially in situations where routine maintenance and calibration are not carried out. This problem would be further exasperated in an automated photofinishing apparatus for use by an untrained individual.

In addition, up-to-date set-up recommendations for all film types are increasingly difficult to maintain as manufacturers flood the market with new film products. Full order scanning is claimed to reduce the number of individual set-ups required, but the technique may produce an erroneous full-order color balance offset, if a roll contains predominantly high color subject matter. The sensitometric reference patches produced by the apparatus 10 eliminates the aforementioned errors, and provide an accurate roll specific color balance offset, independent of scene content, thereby allowing substantially more accurate levels of chromatic correction to be applied on a scene-by-scene basis, which will minimize color induced printer errors and maximize printing quality. Additionally, the information scanned at station 48 can be used to compensate for any variation in the chemical activity of the processing solutions.

The printing conditions as adjusted are used to control the printing of a film at station 56 whereby the exposed film is exposed onto photosensitive paper 60 being supplied by a paper cassette 62. Appropriate means are provided (not shown) for moving the paper 60 in response to the exposures being provided thereon as is customarily done in the art. When the customer comes to pick up the order, the customer provides the appropriate ID and payment, the envelope 64 is returned and dispensed to the customer.

After printing of the images onto the photosensitive paper 60, the cartridge 30 is passed into a loading envelope 64 where it awaits receipt of the prints.

The exposed photosensitive paper is passed through the paper processor section 70, which in the particular embodiment illustrated, comprises a developer bath 71, a bleach bath 72, three wash/stabilizer baths 73, and a drying section 74 where the photosensitive paper 60 is dried. After the prints 79 have been dried, the individual prints are cut from the web and appropriately collated and transported to stacking station 80 where they are loaded into the return envelope 64 containing cartridge 30, which was used to produce the prints. The envelope 64 is then assigned to an appropriate storage location (not shown) associated with the unique customer order identification number.

After the prints 79 have come out of the processor, and before stacking station 80, the printed reference patches are passed over a reflection densitometer 85 where it is measured. The print and associated data are used by the apparatus calibration system. As previously noted, the sensitometric patches provided can be used for modifying the algorithms for printing at exposure station 56. The utility of these patches can also be extended to provide a closed loop calibration of the entire apparatus 10 by utilizing exposed, unprocessed, manufacturer-provided calibration film. The self calibration method is based on a two-stage process for applying sensitometric latent image reference patches. The first set of reference exposures is applied on the film by the manufacturer in a carefully controlled environment. The second set of patches is applied by the apparatus 10 as previously discussed. Since the control method relies on the deltas between the manufacturer-provided exposure and the reference exposures provided by apparatus 10, the exposure made by the manufacturer and apparatus 10 need not be matched. The calibration film having both the manufacturer-provided exposures and the exposures provided by apparatus 10 is run through the entire photofinishing apparatus, and the measured film scanning data and the paper scanning data are compared to the existing population data that was compiled from the accumulated sensitometric reference patch data from previous photofinishing orders. Based on accumulated history, process control charts and action limits are automatically established by comparing the machine-specific data and the base line provided by the manufacturer. If the difference between the manufacturer applied reference patches and the patches applied by apparatus 10 exceed predetermined predefined levels, the processing and/or printing stations are adjusted to provide conformance. This feature minimizes or eliminates the tedious set-up and calibration activities required by conventional photofinishing equipment and serves to extend the operating interval between routine maintenance which is critical to the successful operation of an automated photofinishing device designed for use by an untrained individual.

The conformance of the apparatus 10 to predetermined photofinishing standards is accomplished by both long term and short term automated control means. The short term control means are primarily carried out by controlling printing of the paper at printing station 56. Specifically the measured film scanning data and measured paper scanning data from the reference patches and the customer images are used by the scene balance algorithm to establish film roll-specific color balance and film frame-specific color balance instructions that cause the printing station 56 to produce properly color balanced prints. With respect to long term control means, various aspects of the processing stations 44,70 may be controlled, for example, but not by way of limitation, rate of replenishment of the processing solutions, degrees of agitation of the processing solutions, temperature of the processing solutions and drier sections, and time of exposure of the photosensitive material to the processing solutions. A type processor which is well suited for carrying out the above-described control means is described in copending U.S. patent application filed Oct. 27, 1994, entitled "Method and Apparatus for Processing Photosensitive Film", which is hereby incorporated by reference.

When a customer returns to the processing apparatus 10 and enters the appropriate identification number at a control panel 12, the completed return envelope is dispensed. If the customer misplaces the identification tag, or forgets the identification number, the original credit card may reinserted and the current order assigned to the credit card will be dispensed.

Various changes and modifications may be made without departing from the scope of the present invention, the present invention being defined by the following claims.

| Parts List: | |
|---|---|
| 10 ... apparatus | 49 ... reference patches |
| 12 ... control panel | 50,52 ... scanners |
| 13 ... touch keypads | 51 ... filmstrip |
| 14 ... display device | 53 ... reel |
| 20 ... slot | 55 ... development bath |
| 22 ... cartridge delivery opening | 56 ... printing station |
| 24 ... CPU | 57 ... bleach bath |
| 30 ... film cartridge | 59,63 ... wash bath |
| 33 ... scanner | 60 ... photosensitive paper |
| 35 ... sensitometer | 61 ... fix bath |
| 37 ... pulsed xenon lamp | 62 ... paper cassette |
| 39 ... optical filter | 64 ... envelope |
| 40 ... waiting station | 65 ... stabilizing bath |
| 41 ... light pipe | 69 ... dryer |
| 42 ... film preparation station | 70 ... paper processor section |
| 43 ... film exposure gate | 71 ... developer bath |
| 44 ... processing section | 72 ... bleach bath |
| 46 ... transfer station | 73 ... wash/stabilizer baths |
| 47 ... microprocessor control | 74 ... drying section |
| 48 ... read station | 79 ... prints |
| | 80 ... stacking station |
| | 85 ... reflection densitometer |

We claim:

1. An automated photofinishing apparatus for receiving exposed film, processing the exposed film, printing the processed film so as to produce prints, and dispensing of the prints and processed film to a customer, comprising:
    means for delivering to the apparatus an exposed strip of film, said film having a first unexposed area and a second exposed area containing images;
    means for applying a reference exposure onto said first unexposed area;
    means for processing said exposed film so as to develop the images on a second area of the film and said reference exposure on said first area;
    means for scanning said first and second areas so as to obtain information regarding the photometric balance of the film;
    means for printing said film in accordance with said information data received from said means for scanning;
    means for processing said prints; and
    means for delivering said prints to said customer.

2. An automated photofinishing apparatus according to claim 1 further comprising payment means for accepting payment from a customer.

3. An automated photofinishing apparatus according to claim 2 wherein said payment means comprises a device for receiving payment by credit card payment.

4. An automated photofinishing apparatus according to claim 2 wherein said payment means comprises a device for receiving payment by cash.

5. An automated photofinishing apparatus according to claim 1 further comprising display means for providing instructional information to the user.

6. An automated photofinishing apparatus according to claim 5 wherein said display means comprises a video display tube.

7. An automated photofinishing apparatus according to claim 1 further comprising data entry means for supplying customer order information and/or instructional information to the apparatus.

8. An automated photofinishing apparatus according to claim 7 wherein said data entry means comprises keypads.

9. An automated photofinishing apparatus according to claim 7 wherein said data entry means comprises a touch sensitive CRT screen.

10. An automated photofinishing apparatus according to claim 7 wherein said data entry means comprises a customer ID order card.

11. An automated photofinishing apparatus according to claim 1 further comprising means for sorting and packaging prints made by said apparatus in accordance with individual customer orders.

12. An automated photofinishing apparatus according to claim 1 where said film comprises a strip of film.

13. An automated photofinishing apparatus for receiving exposed film, processing the exposed film, printing the processed film so as to produce prints, and dispensing of the prints and processed film to a customer, comprising:
   means for delivering to the apparatus an exposed strip of film, said film having a first unexposed area and a second exposed area containing images;
   means for applying a reference exposure onto said first unexposed area;
   means for processing said exposed film so as to develop the images on a second area of the film and said reference exposure on said first area;
   means for scanning said first and second areas so as to obtain information regarding the photometric balance of the film;
   means for printing said film in accordance with said information data received from said means for scanning;
   means for scanning the prints in the area produced from said first and second areas of said developed film and obtaining data regarding the degree which the prints meet predetermined standards;
   means for storing said data;
   means for adjusting at least one photofinishing parameter in response to said data for use in later photofinishing;
   means for processing said prints; and
   means for delivering said prints to said customer.

14. An automated photofinishing apparatus according to claim 13 further comprising payment means for accepting payment from a customer.

15. An automated photofinishing apparatus according to claim 14 wherein said payment means comprises a device for receiving payment by credit card payment.

16. An automated photofinishing apparatus according to claim 14 wherein said payment means comprises a device for receiving payment by cash.

17. An automated photofinishing apparatus according to claim 13 further comprising display means for providing instructional information to the user.

18. An automated photofinishing apparatus according to claim 17 wherein said display comprises a video display tube.

19. An automated photofinishing apparatus according to claim 13 further comprising data entry means for supplying customer order information and/or instructional information to the apparatus.

20. An automated photofinishing apparatus according to claim 19 wherein said data entry means comprises a touch sensitive CRT screen.

21. An automated photofinishing apparatus according to claim 19 wherein said data entry means comprises a customer ID order card.

22. An automated photofinishing apparatus according to claim 19 wherein said data entry means comprises keypads.

23. An automated photofinishing apparatus according to claim 13 further comprising means for sorting and packaging prints made by said apparatus in accordance with individual customer orders.

24. An automated photofinishing apparatus according to claim 13 where said film comprises a strip of film.

25. An automated photofinishing apparatus for receiving exposed film, processing the exposed film, printing the processed film so as to produce prints, and dispensing of the prints and processed film to a customer, comprising:
   means for delivering to the apparatus an exposed film, said film having a first unexposed area and a second exposed area containing images;
   means for applying a reference exposure onto said first unexposed area;
   means for processing said exposed film so as to develop the images on a second area of the film and said reference exposure on said first area;
   means for printing said film;
   means for scanning the prints in the area produced from said first and/or second areas of said developed film and obtaining data regarding the degree which the prints meet predetermined standards, said second area having reference patches provided by the film manufacturer;
   means for storing said data;
   means for adjusting at least one photofinishing parameter in response to said data for use in later photofinishing;
   means for processing said prints; and
   means for delivering said prints to said customer.

26. An automated photofinishing apparatus according to claim 25 further comprising payment means for accepting payment from a customer.

27. An automated photofinishing apparatus according to claim 26 wherein said payment means comprises a device for receiving payment by credit card payment.

28. An automated photofinishing apparatus according to claim 26 wherein said payment means comprises a device for receiving payment by cash.

29. An automated photofinishing apparatus according to claim 25 further comprising display means for providing instructional information to the user.

30. An automated photofinishing apparatus according to claim 29 wherein said display means comprises a video display tube.

31. An automated photofinishing apparatus according to claim 29 further comprising data entry means for supplying customer order information and/or instructional information to the apparatus.

32. An automated photofinishing apparatus according to claim 31 wherein said data entry means comprises keypads.

33. An automated photofinishing apparatus according to claim 31 wherein said data entry means comprises a touch sensitive CRT screen.

34. An automated photofinishing apparatus according to claim 31 wherein said data entry means comprises a customer ID order card.

35. An automated photofinishing apparatus according to claim 25 further comprising means for sorting and packaging prints made by said apparatus in accordance with individual customer orders.

36. An automated photofinishing apparatus according to claim 25 where said film comprises a strip of film.

37. A method for automatically processing a photosensitive filmstrip and producing prints therefrom for delivery to a customer, comprising the steps of:
   a) providing a photosensitive filmstrip having a first unexposed area and a second exposed area containing at least one latent image;

b) providing an exposure of a known light intensity onto said unexposed first area;

c) developing said photosensitive material;

d) scanning said first and second areas so as to obtain information regarding the photometric balance of the filmstrip for use in determining printing conditions therefrom;

e) printing the images on filmstrip in accordance with said determined information; and f) processing the images on said filmstrip so as to produce prints and returning the prints to the user.

38. A method for automatically processing a photosensitive filmstrip and producing prints for delivery to a customer, comprising the steps of:

a) providing a photosensitive filmstrip having a first unexposed area and a second exposed area containing at least one latent image;

b) providing an exposure of a known light intensity onto said unexposed first area;

c) developing said photosensitive material;

d) scanning said first and second areas so as to obtain information regarding the photometric balance of the filmstrip for use in determining printing conditions therefrom;

e) printing the images on photosensitive filmstrip in accordance with said determined information;

f) processing the images on said photosensitive filmstrip so as to produce prints;

g) scanning the prints in the area produced from said first and/or second areas of said developed filmstrip and obtaining data regarding the degree which the prints meet predetermined standards;

h) storing said data;

i) adjusting at least one photofinishing parameter in response to said data for use in later photofinishing; and j) returning the prints to the customer.

39. A method according to claim 38, further comprising the steps of:

using said data to identify the prints that do not meet said predetermined standards;

reprinting said prints that do not meet said predetermined standards using corrected values derived from said data.

40. A method for automatically processing a photosensitive filmstrip and producing prints for delivery to a customer, comprising the steps of:

a) providing at least one photosensitive filmstrip having a first unexposed area and a second exposed area containing at least one latent image;

b) providing an exposure of a known light intensity onto said unexposed first area;

c) developing said photosensitive material;

d) printing the images on photosensitive material;

e) processing the images on said photosensitive material so as to produce prints;

f) scanning the prints in the area produced from said first and second areas of said developed filmstrip and obtaining data regarding the degree which the prints meet predetermined standards;

g) storing said data;

h) compiling sensitometric data based on said at least one photosensitive filmstrip;

i) returning the prints to the customer;

j) providing a calibration roll of a photosensitive filmstrip having a first area of film of known exposures designed to film manufacturing specifications and a second unexposed area, and developing prints made from said calibration roll;

k) providing an exposure of a known light intensity onto said second unexposed area;

l) developing said photosensitive material; and m) scanning said first area and second areas of said calibration filmstrip and developing prints made from said calibration roll so as to obtain information regarding the photometric balance of the calibration filmstrip; and n) comparing the senistometric data obtained from said calibration roll with said compiled sensitometric data from said first at least one photosensitive filmstrip and adjusting the apparatus to provide conformance.

* * * * *